(12) United States Patent
Liu et al.

(10) Patent No.: US 12,002,378 B1
(45) Date of Patent: Jun. 4, 2024

(54) METHOD AND DEVICE FOR CALIBRATING CHEST OF VEHICLE CRASH DUMMY

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhixin Liu, Tianjin (CN); Hanxiao Zhang, Tianjin (CN); Kai Wang, Tianjin (CN); Weidong Liu, Tianjin (CN); Yongqiang Wu, Tianjin (CN); Minghao Xie, Tianjin (CN); Ye Hao, Tianjin (CN); Shenghua Qiao, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 18/474,268

(22) Filed: Sep. 26, 2023

(30) Foreign Application Priority Data

Dec. 9, 2022 (CN) .......................... 202211575634.0

(51) Int. Cl.
  *G09B 23/32* (2006.01)
  *G01M 7/08* (2006.01)
(52) U.S. Cl.
  CPC ............... *G09B 23/32* (2013.01); *G01M 7/08* (2013.01)
(58) Field of Classification Search
  CPC .................................. G01M 7/08; G09B 23/32
  See application file for complete search history.

(56) References Cited

U.S. PATENT DOCUMENTS

| | | | |
|---|---|---|---|
| 10,229,616 B2 | 3/2019 | Khambati et al. | |
| 10,943,510 B2 | 3/2021 | Khambati et al. | |
| 11,244,088 B2 | 2/2022 | Shah | |

FOREIGN PATENT DOCUMENTS

| | | | | |
|---|---|---|---|---|
| CN | 102878965 A | * | 1/2013 | |
| CN | 109211509 A | * | 1/2019 | .............. G01M 7/08 |
| CN | 117190949 A | * | 12/2023 | |

OTHER PUBLICATIONS

Zhang Shizhe, Chinese Master's Theses Full-text Database Engineering Science and Technology, Optimization of Vehicle Restraint Based On Finite Element Model of Driver's Chest in Frontal Impact, 2022, pp. 32-33, Issue 1, China.

* cited by examiner

*Primary Examiner* — Natalie Huls
(74) *Attorney, Agent, or Firm* — True Shepherd LLC; Andrew C. Cheng

(57) ABSTRACT

A method for calibrating a chest of a vehicle crash dummy, includes: controlling, under each preset test condition, a pressing apparatus to press down a chest of a target crash dummy with a target pressing speed and a target pressing distance corresponding to the preset test condition, obtaining an actual force-displacement curve under each preset test condition, obtaining a standard force-displacement curve of a chest of a standard crash dummy under each preset test condition, and determining, according to the actual force-displacement curve and the standard force-displacement curve under each preset test condition, whether the chest of the target crash dummy satisfies a biological simulation standard. Through collecting information under various preset test conditions, various complicated conditions of impact on the chest can be more effectively simulated in a crash test by using the method, which improves the accuracy of determining the biological simulation standard.

7 Claims, 7 Drawing Sheets

METHOD AND DEVICE FOR CALIBRATING CHEST OF VEHICLE CRASH DUMMY

CROSS-REFERENCE TO RELATED APPLICATIONS

This application claims priority to Chinese Patent Application No. 202211575634.0 with a filing date of Dec. 9, 2022. The content of the aforementioned application, including any intervening amendments thereto, is incorporated herein by reference.

TECHNICAL FIELD

The present disclosure relates to the field of data processing, and particularly relates to a method and device for calibrating a chest of a vehicle crash dummy.

DESCRIPTION OF RELATED ART

The continuous improvement of people's economic level has boosted an increase in the number of vehicles in China year by year. Then along comes frequent occurrence of traffic accidents. Therefore, vehicle safety has attracted more and more attention. As an important testing method to verify a vehicle occupant protection system, a passive safety testing technology for vehicles plays an important role in occupant protection. A vehicle crash test is an important testing method to verify vehicle safety performance. A crash dummy used in the crash test is a key measurement device in a vehicle passive safety test.

After a certain number of crash tests, the chest ribs of the crash dummy will be displaced and damaged due to the impact of airbags and safety belts. However, the existing test standard for calibrating a chest of a crash dummy has a single condition and mode, and focuses more on a calibration effect of an entire chest. According to the standard, the entire chest of a target crash dummy may well be mistakenly determined to satisfy the standard even if part of the chest does not satisfy the standard. Its calibration effect is relatively poor.

In view of this, the present disclosure is proposed.

SUMMARY OF PRESENT INVENTION

In order to solve the above technical problems, the present disclosure provides a method and device for calibrating a chest of a vehicle crash dummy, so as to solve a problem of a single calibration mode in the prior art and improve a calibration effect.

An embodiment of the present disclosure provides a method for calibrating a chest of a vehicle crash dummy. The method is applied to a device for calibrating a chest of a vehicle crash dummy. The device for calibrating a chest of a vehicle crash dummy includes a fixed target crash dummy and a pressing apparatus. The pressing apparatus is provided with a pressure sensor and a displacement sensor.

The method includes: controlling, under each preset test condition, the pressing apparatus to press down a chest of the target crash dummy with a target pressing speed and a target pressing distance corresponding to the preset test condition; determining, based on the pressure sensor and the displacement sensor, an actual force-displacement curve of the chest of the target crash dummy under each preset test condition, where the actual force-displacement curve is configured to describe a changing relation between force and displacement; and obtaining a standard force-displacement curve of a chest of a standard crash dummy of a same type as the target crash dummy under each preset test condition, and determining, based on the actual force-displacement curve and the standard force-displacement curve under each preset test condition, whether the chest of the target crash dummy satisfies a biological simulation standard.

An embodiment of the present disclosure provides a device for calibrating a chest of a vehicle crash dummy. The device is configured to implement the method for calibrating a chest of a vehicle crash dummy according to any one of the embodiments of the present disclosure. The device includes a fixed target crash dummy, a pressing apparatus, and a control apparatus. The pressing apparatus is provided with a pressure sensor and a displacement sensor. The control apparatus is connected to the displacement sensor, the pressing apparatus and the pressure sensor respectively.

The pressing apparatus is configured to press down the chest of the target crash dummy.

The displacement sensor is configured to collect displacement of the chest of the target crash dummy in a process of pressing down the chest of the target crash dummy by the pressing apparatus.

The pressure sensor is configured to collect force of the chest of the target crash dummy in the process of pressing down the chest of the target crash dummy by the pressing apparatus.

The control apparatus is configured to control, under each preset test condition, the pressing apparatus to press down the chest of the target crash dummy with a target pressing speed and a target pressing distance corresponding to the preset test condition; determine, according to the collected the displacement and force, an actual force-displacement curve of the chest of the target crash dummy under each preset test condition; and obtain a standard force-displacement curve of a chest of a standard crash dummy of a same type as the target crash dummy under each preset test condition, and determine, based on the actual force-displacement curve and the standard force-displacement curve under each preset test condition, whether the chest of the target crash dummy satisfies a biological simulation standard.

The embodiments of the present disclosure have the following technical effects:

Under each preset test condition, the pressing apparatus is controlled to press down the chest of the target crash dummy with the target pressing speed and the target pressing distance corresponding to the preset test condition, the actual force-displacement curve of the chest of the target crash dummy under each preset test condition is obtained, the standard force-displacement curve of the chest of the standard crash dummy of the same type as the target crash dummy under each preset test condition is obtained, and according to the actual force-displacement curve and the standard force-displacement curve under each preset test condition, whether the chest of the target crash dummy satisfies the biological simulation standard is determined. Through determination according to the actual force-displacement curve and the standard force-displacement curve under each preset test condition, various complicated conditions of impact on the chest can be more effectively simulated in a crash test by using the method, which comprehensively determines the differences of the chest of the crash dummy, solves a problem of a single calibration mode in the prior art, and further improves the accuracy of determining the biological simulation standard and ensures the validity and accuracy of a subsequent crash test using a dummy.

BRIEF DESCRIPTION OF THE DRAWINGS

In order to describe technical solutions in specific implementations of the present disclosure or in the prior art more clearly, the accompanying drawings required in the description of the specific implementations or the prior art will be briefly introduced below. Apparently, the accompanying drawings in the following description show only some implementations of the present disclosure, and those of ordinary skill in the art can still derive other drawings from these drawings without any creative effort.

DESCRIPTION OF THE EMBODIMENTS

For making objectives, technical solutions and advantages of the present disclosure clearer, the technical solutions of the present disclosure will be clearly and completely described below. Obviously, the embodiments described are merely some embodiments rather than all embodiments of the present disclosure. All other embodiments obtained by those of ordinary skill in the art based on the embodiments of the present disclosure without creative efforts shall fall within the protection scope of the present disclosure.

Figure 1:
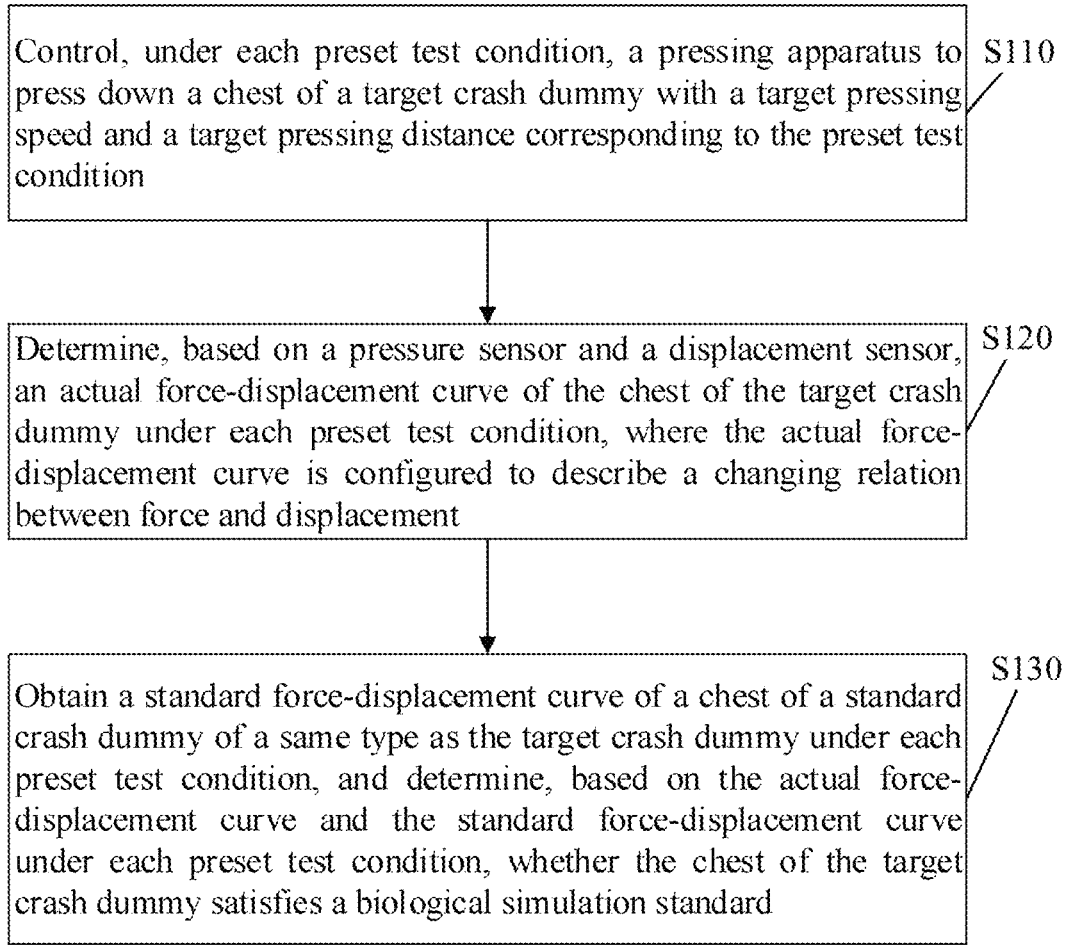
FIG. 1 is a flow diagram of a method for calibrating a chest of a vehicle crash dummy according to an embodiment of the present disclosure.

FIG. 1 is a flow diagram of a method for calibrating a chest of a vehicle crash dummy according to an embodiment of the present disclosure. The method is applied to a device for calibrating a chest of a vehicle crash dummy. The device for calibrating a chest of a vehicle crash dummy includes a fixed target crash dummy and a pressing apparatus. The pressing apparatus is provided with a pressure sensor and a displacement sensor. With reference to FIG. 1, the method for calibrating a chest of a vehicle crash dummy specifically includes:

S110, under each preset test condition, the pressing apparatus is controlled to press down a chest of the target crash dummy with a target pressing speed and a target pressing distance corresponding to the preset test condition.

The target crash dummy may be a crash test dummy whose chest needs to be detected whether to satisfy a biological simulation standard. For example, the crash dummy used in a crash test possibly has chest damage or deformation after undergoing a certain number of chest crash tests. Therefore, this type of crash dummy can be used as the target crash dummy, so as to detect whether the crash dummy satisfies the biological simulation standard. Further, the accuracy and reliability of a subsequent test are ensured.

The target crash dummy may be fixed to a moving module, and a pressing support connected to a slide rail may be placed at a preset position. The pressing support may provide a pressing support force for the chest of the target crash dummy during the test. The pressing apparatus may be located at a top of a test bed frame. The pressing apparatus is aligned with an upper surface of the chest of the target crash dummy, and moves downward to apply pressure to the upper surface of the chest of the target crash dummy, so as to simulate the chest of the target crash dummy. The pressure sensor is integrated on a surface, in contact with the chest of the target crash dummy, of the pressing apparatus during pressing. The displacement sensor may be mounted in the pressing apparatus, and may detect displacement of the pressing apparatus in real time under each preset test condition, which is also displacement of the upper surface of the chest of the target crash dummy.

Specifically, the embodiment may control the pressing apparatus to press the chest of the target crash dummy according to each preset test condition, such that relevant information under each preset test condition is obtained. The preset test conditions may be various preset simulation conditions, including the target pressing speed and the target pressing distance. The target pressing speed may be a pressing speed of the pressing apparatus. The target pressing distance may be a pressing distance of the pressing apparatus. It should be noted that under each preset test condition, a contact point between the upper surface of the chest of the target crash dummy and the pressing apparatus is a zero point, and a downward pressing distance of the pressing apparatus is the target pressing distance.

For example, all the preset test conditions of the embodiment may include a low-speed and low-range condition and a high-speed and high-range condition. For example, under the low-speed and low-range condition, it may be pressed down by 30 mm at 0.2 m/s; and under the high-speed and high-range condition, it may be pressed down by 60 mm at 0.4 m/s.

Specifically, under each preset test condition, a pressing process with the target pressing speed and the target pressing distance corresponding to the preset test condition is as follows: the pressing apparatus presses down at the target pressing speed from the zero point until it reaches a limit position (i.e., the target pressing distance), and returns upward after keeping at the limit position for a period of time (for example, 0.1 s). A returning speed may be consistent with the target pressing speed. That is, the returning speed is consistent with the pressing speed.

S120, based on the pressure sensor and the displacement sensor, an actual force-displacement curve of the chest of the target crash dummy under each preset test condition is determined, where the actual force-displacement curve is configured to describe a changing relation between force and displacement.

Specifically, under each preset test condition, the pressure sensor may collect pressure of the pressing apparatus in real time, i.e., force of the upper surface of the chest of the target crash dummy, and the displacement sensor may collect the displacement of the pressing apparatus in real time, which is also the displacement of the upper surface of the chest of the target crash dummy.

For each preset test condition, the actual force-displacement curve under the preset test condition may be constructed according to the force and displacement collected by the pressure sensor and the displacement sensor, respectively.

The actual force-displacement curve may describe a changing relation between force and displacement of the upper surface of the chest of the target crash dummy in the pressing process under the preset test conditions, i.e., a corresponding relation between each force and each displacement in the pressing process. Specifically, the actual force-displacement curve may be a curve in which the displacement changes with the force, or a curve in which the force changes with the displacement.

In the embodiment, for each preset test condition, the pressing apparatus may be repeatedly controlled to press down the chest of the target crash dummy with the target pressing speed and the target pressing distance corresponding to the preset test condition, such that multiple data about force and displacement are obtained. For example, each preset test condition may be repeated for 3 times.

Further, a plurality of actual force-displacement curves may be constructed according to the multiple data about the force and displacement, respectively, and further a mean curve of the plurality of actual force-displacement curves is used as a final actual force-displacement curve; and alternatively, mean force and mean displacement of the multiple data about force and displacement are determined, and the actual force-displacement curve is constructed according to the mean force and mean displacement. Pressing is conducted repeatedly under each preset test condition, such that the accuracy of the actual force-displacement curve under each preset test condition can be further improved.

S130, a standard force-displacement curve of a chest of a standard crash dummy of a same type as the target crash dummy under each preset test condition is obtained, and based on the actual force-displacement curve and the standard force-displacement curve under each preset test condition, whether the chest of the target crash dummy satisfies the biological simulation standard is determined.

The standard crash dummy may be a brand-new dummy of the same type as the target crash dummy. The standard force-displacement curve may be configured to describe a changing relation between force and displacement of the chest of the standard crash dummy.

Specifically, under each preset test condition, the pressing apparatus may be controlled to press down the chest of the standard crash dummy with the target pressing speed and the target pressing distance corresponding to the preset test condition, such that the standard force-displacement curve under the preset test condition is obtained.

Each preset test condition may also be repeated for multiple times. For example, each preset test condition is repeated for 10 times. The standard force-displacement curve is constructed according to the force and displacement obtained in each pressing process, and further the mean curve of all the standard force-displacement curves is used as the standard force-displacement curve under the preset test condition. Certainly, the standard force-displacement curve may be determined before the actual force-displacement curve is determined.

It should be noted that in the embodiment, an execution sequence of obtaining each standard force-displacement curve and determining each actual force-displacement curve is not particular. It is possible to obtain each standard force-displacement curve and then determine each actual force-displacement curve, which is not limited in the embodiment.

After the actual force-displacement curve and the standard force-displacement curve under each preset test condition are obtained, according to which, whether the chest of the target crash dummy satisfies the biological simulation standard may be further determined. If so, chest deformation of the target crash dummy is ignorable and the dummy may still be used for the subsequent crash test. If not, the chest of the target crash dummy is damaged or deformed obviously and the dummy needs to be repaired.

For each preset test condition, a similarity, an overlapping rate or an error rate between the actual force-displacement curve and the standard force-displacement curve under the preset test condition may be determined, according to which, whether the chest of the target crash dummy satisfies the biological simulation standard under the preset test condition may be further determined.

It should be noted that in this embodiment, the embodiment determines whether the chest of the target crash dummy satisfies the biological simulation standard according to the actual force-displacement curve and the standard force-displacement curve under each preset test condition as follows: the changing relations between the force and the displacement of the chest of the target crash dummy in the pressing process are compared according to the actual force-displacement curve and the standard force-displacement curve, and when a difference between the changing relation between the force and the displacement of the chest of the target crash dummy and that of the chest of the standard crash dummy is large, it may be determined that the chest of the target crash dummy does not satisfy the biological simulation standard.

Further, if the chest of the target crash dummy satisfies the biological simulation standard under all the preset test conditions, it may be determined that the chest of the target crash dummy satisfies the biological simulation standard.

In a specific implementation, the step that based on the actual force-displacement curve and the standard force-displacement curve under each preset test condition, whether the chest of the target crash dummy satisfies the biological simulation standard is determined may include:

for each preset test condition, based on a plurality of standard force-displacement curves under the preset test condition, a standard mean curve under the preset test condition and a corridor region corresponding to the standard mean curve are determined, where the corridor region covers all the standard force-displacement curves, and includes an inner corridor region and an outer corridor region; and for each preset test condition, based on the actual force-displacement curve, the standard mean curve, the inner corridor region and the outer corridor region under the preset test condition, whether the chest of the target crash dummy satisfies the biological simulation standard under the preset test condition is determined.

Specifically, for each preset test condition, the chest of the standard crash dummy may be repeatedly pressed down to obtain a plurality of standard force-displacement curves. Further, the mean curve of all the standard force-displacement curves is used as the standard mean curve.

A value of each point in the mean curve is a mean of the points at the same position in all the standard force-displacement curves. For example, the mean curve of all the standard force-displacement curves may be used as the standard mean curve as follows: a mean of values of coordinate points at the same position of all the standard force-displacement curves is used as a mean of the coordinate point; and the standard mean curve is obtained according to means of all coordinate points.

The corridor region corresponding to the standard mean curve under the preset test condition may be further determined while the standard mean curve under the preset test condition is determined. Specifically, the corridor region covers all the standard force-displacement curves, and the corridor region is divided into the inner corridor region and the outer corridor region.

The corridor region is a region centered on the standard mean curve and having a specific width. The inner corridor region is a region centered on the standard mean curve and including the standard mean curve. The outer corridor region is a hollow region centered on the standard mean curve, away from the standard mean curve and adjacent to the inner corridor region. The inner corridor region may have a less width than the outer corridor region.

Further, for each preset test condition, according to a difference between the actual force-displacement curve and the standard mean curve under the preset test condition, whether the actual force-displacement curve is located inside the inner corridor region, or whether the actual force-displacement curve is located outside the corridor region, it may be determined whether the chest of the target crash dummy satisfies the biological simulation standard under the preset test condition.

For example, if the actual force-displacement curve under the preset test condition is completely located inside the inner corridor region, it may be determined that the chest of the target crash dummy satisfies the biological simulation standard under the preset test condition. If the actual force-displacement curve under the preset test condition is completely outside the corridor region, it may be determined that the chest of the target crash dummy does not satisfy the biological simulation standard under the preset test condition. If the actual force-displacement curve under the preset test condition is partially located inside the corridor region and partially located outside the corridor region, whether the chest of the target crash dummy satisfies the biological simulation standard may be further determined according to the difference between the actual force-displacement curve and the standard mean curve.

The standard mean curve under each preset test condition and the corridor region corresponding to the standard mean curve are determined, and further whether the chest of the target crash dummy satisfies the biological simulation standard under each preset test condition is determined according to the actual force-displacement curve, the standard mean curve and the corridor region, such that whether the biological simulation standard is satisfied is determined based on the changing relation between the force and the displacement of the chest of the target crash dummy in the pressing process, and the accuracy is ensured.

Alternatively, based on the actual force-displacement curve, the standard mean curve, the inner corridor region and the outer corridor region under the preset test condition, whether the chest of the target crash dummy satisfies the biological simulation standard under the preset test condition may be determined as follows:

based on the actual force-displacement curve, the standard mean curve, the inner corridor region and the outer corridor region under the preset test condition, a similarity between the actual force-displacement curve and the standard mean curve under the preset test condition is determined; and according to the similarity and a preset similarity threshold, whether the chest of the target crash dummy satisfies the biological simulation standard under the preset test condition is determined.

The preset similarity threshold may be a preset critical value of the similarity. The similarity between the actual force-displacement curve and the standard mean curve may be measured according to a position of the actual force-displacement curve in the corridor region.

For example, if the actual force-displacement curve is completely located inside the inner corridor region, the similarity between the actual force-displacement curve and the standard mean curve is high. If the actual force-displacement curve is completely located outside the corridor region, the similarity between the actual force-displacement curve and the standard mean curve is low. If the actual force-displacement curve is only partially located outside the corridor region, the similarity between the actual force-displacement curve and the standard mean curve may be determined according to part of the actual force-displacement curve located inside the corridor region.

Further, if the similarity under the preset test condition is less than the preset similarity threshold, it may be determined that a large difference exists between the actual force-displacement curve and the standard mean curve. Further, it may be determined that a large difference exists between the changing relation between the force and the displacement of the chest of the target crash dummy and that of the chest of the standard crash dummy, and the chest of the target crash dummy under the preset test condition does not satisfy the biological simulation standard. In this way, the similarity based on the corridor region is determined, and further whether the biological simulation standard is satisfied is determined according to the similarity and the similarity threshold, such that the accuracy is improved.

In a specific implementation, the step that based on the actual force-displacement curve, the standard mean curve, the inner corridor region and the outer corridor region under the preset test condition, the similarity between the actual force-displacement curve and the standard mean curve under the preset test condition is determined may include the following steps:

Step 1: for each displacement point in the actual force-displacement curve under the preset test condition, an actual force corresponding to the displacement point in the actual force-displacement curve and a reference force corresponding to the displacement point in the standard mean curve are determined;

Step 2: an actual difference between the actual force and the reference force is determined, and a corridor grade of the displacement point is determined based on the actual difference, a width of the inner corridor region and a width of the outer corridor region; and Step 3: based on the corridor grade of each displacement point, the similarity between the actual force-displacement curve and the standard mean curve under the preset test condition is determined.

In the actual force-displacement curve, an abscissa axis may represent the displacement, and an ordinate axis may represent the force. Specifically, through the above Step 1, an actual force and a reference force corresponding to each displacement point in the actual force-displacement curve can be obtained. The actual force is actual stress corresponding to the displacement point in the actual force-displacement curve, and the reference force is reference stress corresponding to the same displacement point in the standard mean curve.

It should be noted that the corresponding corridor grade may be determined for each displacement point in the actual force-displacement curve, and alternatively, the corresponding corridor grade may be determined for each displacement point, within an evaluation interval, in the actual force-displacement curve. The evaluation interval may correspond to a process of pressing the pressing apparatus from the zero point to the target pressing distance under the preset test condition, that is, from a minimum displacement point to a maximum displacement point.

Further, according to the above Step 2, the reference force is subtracted from the actual force, and an absolute value of a difference is used as the actual difference. Further, the actual difference may be compared with half of the width of the inner corridor region, and then the actual difference may be compared with half of the width of the outer corridor region, such that the corridor grade of the displacement point is determined according to a comparison result.

The widths of the inner corridor region and the outer corridor region may be determined according to a standard deviation of each standard force-displacement curve. For example, half of the width of the inner corridor region and that of the outer corridor region may be computed according to the following formulas, respectively:

$$\delta_i(x) = a_0 \cdot Y_m + a_s \cdot \sigma(x);$$

$$\delta_o(x) = b_0 \cdot Y_m + b_s \cdot \sigma(x);$$

$\delta_i(x)$ represents half of the width of the inner corridor region. $\delta_o(x)$ represents half of the width of the outer corridor region (which actually refers to a distance from an outer boundary of the outer corridor region to the standard mean curve). $\sigma(x)$ represents a standard deviation of all the standard force-displacement curves. $a_0$ and $b_0$ are adjustment parameters. $0 \leq a_0 < b_0 \leq 1$. $a_s$ and $b_s$ are scale factors, which may generally be $a_s = b_s = 1$. $Y_m$ represents a maximum value in the standard mean curve. $Y_m = \max(\min(F(x)), \max(F(x)))$. $F(x)$ represents the standard mean curve.

Further, the standard deviation of all the standard force-displacement curves may be obtained according to the following formula:

$$\sigma(x) = \sqrt{\frac{\sum_{i=1}^{n}(F_i(x) - F(x))^2}{n}}, n = 10.$$

$F_i(x)$ represents an ith standard force-displacement curve. n=10 indicates that the number of standard force-displacement curves is 10. $F(x)$ represents the standard mean curve.

For the above Step 2, alternatively, the actual difference between the actual force and the reference force may be determined, and the corridor grade of the displacement point may be determined based on the actual difference and the widths of the inner corridor region and the outer corridor region as follows:
if the actual difference is less than half of the width of the inner corridor region, the corridor grade of the displacement point is determined to be a first value;
if the actual difference is greater than half of the width of the outer corridor region, the corridor grade of the displacement point is determined to be a second value; and
if the actual difference is greater than half of the width of the inner corridor region and less than that of the outer corridor region, the corridor grade of the displacement point is determined based on the actual difference, half of the width of the outer corridor region, a width difference between half of the width of the inner corridor region and that of the outer corridor region, and a preset attenuation index, where
the first value is greater than the second value, and the greater the corridor grade of the displacement point, the more similar the actual force-displacement curve is to the standard mean curve at the displacement point. For example, the first value may be 1, the second value may be 0, and a range of the corridor grade is [0,1].

Specifically, if the actual difference of a displacement point in the actual force-displacement curve is less than half of the width of the inner corridor region, the displacement point in the actual force-displacement curve is closer to the displacement point at the same position in the standard mean curve, and the corridor grade may be 1. If the actual difference of a displacement point in the actual force-displacement curve is greater than half of the width of the outer corridor region, the displacement point in the actual force-displacement curve is farther away from the displacement point at the same position in the standard mean curve, and the corridor grade may be 0.

If the actual difference of a displacement point in the actual force-displacement curve is between half of the width of the inner corridor region and that of the outer corridor region, the corridor grade of the displacement point may be computed according to the preset attenuation index, the actual difference, half of the width of the outer corridor region, and the width difference between half of the width of the inner corridor region and that of the outer corridor region. The preset attenuation index may be a preset parameter for attenuation of the corridor grade, and describes an attenuation degree of the corridor grade between 0 and 1. The greater the preset attenuation index, the higher the attenuation degree of the corridor grade.

For example, the corridor grade of each displacement point is determined with reference to the following formulas:

$$c_i = \begin{cases} 1 & |f(x_i) - F(x_i)| < \delta_i(x) \\ \left(\dfrac{\delta_o(x) - |f(x_i) - F(x_i)|}{\delta_o(x) - \delta_i(x)}\right)^k & \delta_i(x) < |f(x_i) - F(x_i)| < \delta_o(x) \\ 0 & |f(x_i) - F(x_i)| > \delta_o(x) \end{cases}$$

$c_i$ represents the corridor grade of an ith displacement point. $f(x_i)$ represents an actual force of the ith displacement point. $F(x_i)$ represents a reference force of the ith displacement point. $|f(x_i) - F(x_i)|$ represents an actual difference of the ith displacement point. $\delta_i(x)$ represents half of the width of the inner corridor region. $\delta_o(x)$ represents half of the width of the outer corridor region (which actually refers to a distance from an outer boundary of the outer corridor region to the standard mean curve). k represents the preset attenuation index. $k \in N^*$. For example, k may be 2 or 3.

In this way, the corridor grade of each displacement point can be accurately computed, and further a similarity of an entire curve based on the corridor grade of each displacement point is determined advantageously, such that the accuracy of the similarity is ensured.

Figure 2:
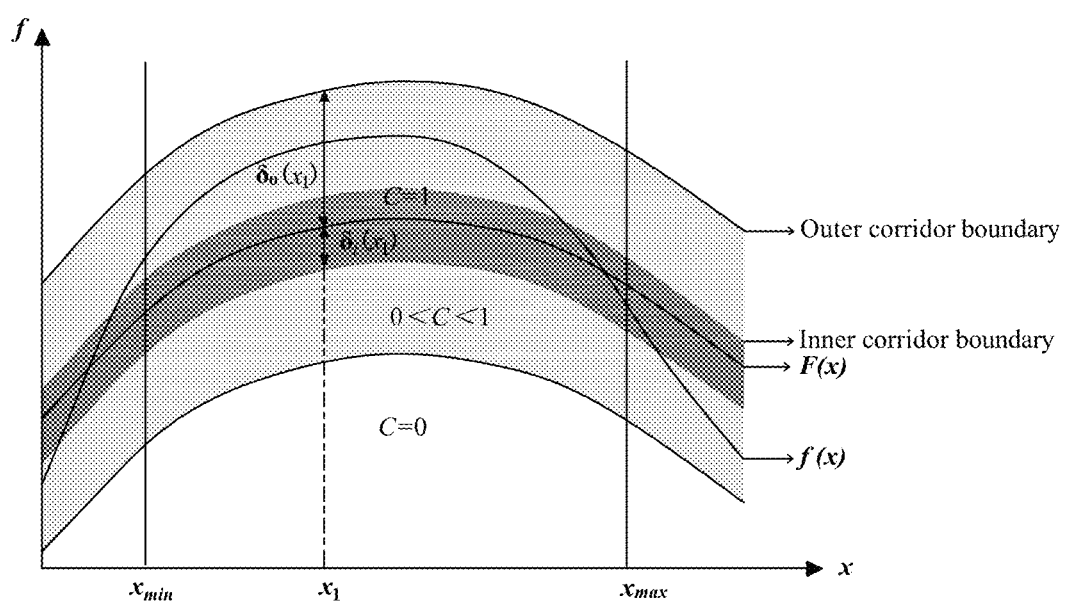
FIG. 2 is a schematic diagram of a corridor region corresponding to a standard mean curve according to an embodiment of the present disclosure.

For example, FIG. 2 is a schematic diagram of a corridor region corresponding to a standard mean curve according to an embodiment of the present disclosure. F(x) is the standard mean curve. f(x) is the actual force-displacement curve. An outer corridor boundary is a boundary of the outer corridor region corresponding to the standard mean curve, which includes an upper boundary and a lower boundary. The inner corridor boundary is a boundary of the inner corridor region corresponding to the standard mean curve, which includes an upper boundary and a lower boundary. The figure illustratively shows the upper boundaries of the inner corridor region and the outer corridor region, and half of the width of the inner corridor region and that of the outer corridor region at the displacement point $x_1$.

With reference to FIG. 2, for each displacement point within the evaluation interval $[x_{min}, x_{max}]$, when an actual force value corresponding to the displacement point is located outside the corridor region (i.e., the actual difference of the displacement point exceeds half of the width of the outer corridor region), C (the corridor grade) is 0. When an actual force value corresponding to the displacement point is located inside the inner corridor region (i.e., the actual difference of the displacement point does not exceed half of the width of the inner corridor region), C (the corridor grade) is 1. When an actual force value corresponding to the displacement point is located inside the outer corridor region (i.e., the actual difference of the displacement point is greater than half of the width of the inner corridor region and less than that of the outer corridor region), C (the corridor grade) is in a range of 0-1.

It should be noted that all the displacement points whose actual differences are between half of the width of the inner corridor region and that of the outer corridor region are computed with the preset attenuation index as follows: when the actual difference of the displacement point is less than half of the width of the outer corridor region and greater than that of the inner corridor region, the corridor grade of the displacement point should be in a range of 0-1, and the corridor grade of the displacement point can be reduced with the preset attenuation index. For example, the corridor grade is 0.8 when the preset attenuation index is not used, and the corridor grade is 0.64 when the preset attenuation index (for example, 2) is used. The corridor grade of this type of displacement point is reduced, such that the similarity of the entire actual force-displacement curve can be reduced, further avoiding the mistaken determination of satisfying the biological simulation standard, due to a high similarity between the actual force-displacement curves of a large number of displacement points having a low corridor grade. In this case, the accuracy is improved.

Further, after the corridor grade of each displacement point is obtained, through the above Step 3, according to the corridor grades of all the displacement points, a mean of the corridor grades of all the displacement points may be determined, and further the mean is used as the similarity between the actual force-displacement curve and the standard mean curve. For example, the similarity may be computed according to the following formula:

$$C = \frac{\sum_{i=1}^{n} C_i}{n}.$$

$C_i$ represents the corridor grade of the ith displacement point, and n represents the number of displacement points in the actual force-displacement curve. C represents the similarity between the actual force-displacement curve and the standard mean curve. A range of C is [0,1]. The closer C is to 1, the better a calibration effect of the chest of the target crash dummy is, and the more similar the actual force-displacement curve is to the standard mean curve.

The corridor grade of each displacement point in the actual force-displacement curve is determined, further the similarity between the actual force-displacement curve and the standard mean curve is determined according to the corridor grade, and the similarity of the entire curve is determined by combining conditions of all points in the curve, such that the accuracy of the similarity is improved, and further the accuracy of determining whether the biological simulation standard is satisfied is improved.

The embodiment has the following technical effects: under each preset test condition, the pressing apparatus is controlled to press down the chest of the target crash dummy with the target pressing speed and the target pressing distance corresponding to the preset test condition, the actual force-displacement curve of the chest of the target crash dummy under each preset test condition is obtained, the standard force-displacement curve of the chest of the standard crash dummy of the same type as the target crash dummy under each preset test condition is obtained, and according to the actual force-displacement curve and the standard force-displacement curve under each preset test condition, whether the chest of the target crash dummy satisfies the biological simulation standard is determined. Through determination according to the actual force-displacement curve and the standard force-displacement curve under each preset test condition, various complicated conditions of impact on the chest can be more effectively simulated in a crash test by using the method, which comprehensively determines the differences of the chest of the crash dummy, solves a problem of a single calibration mode in the prior art, and further improves the accuracy of determining the biological simulation standard and ensures the validity and accuracy of a subsequent crash test using a dummy.

Figure 3:
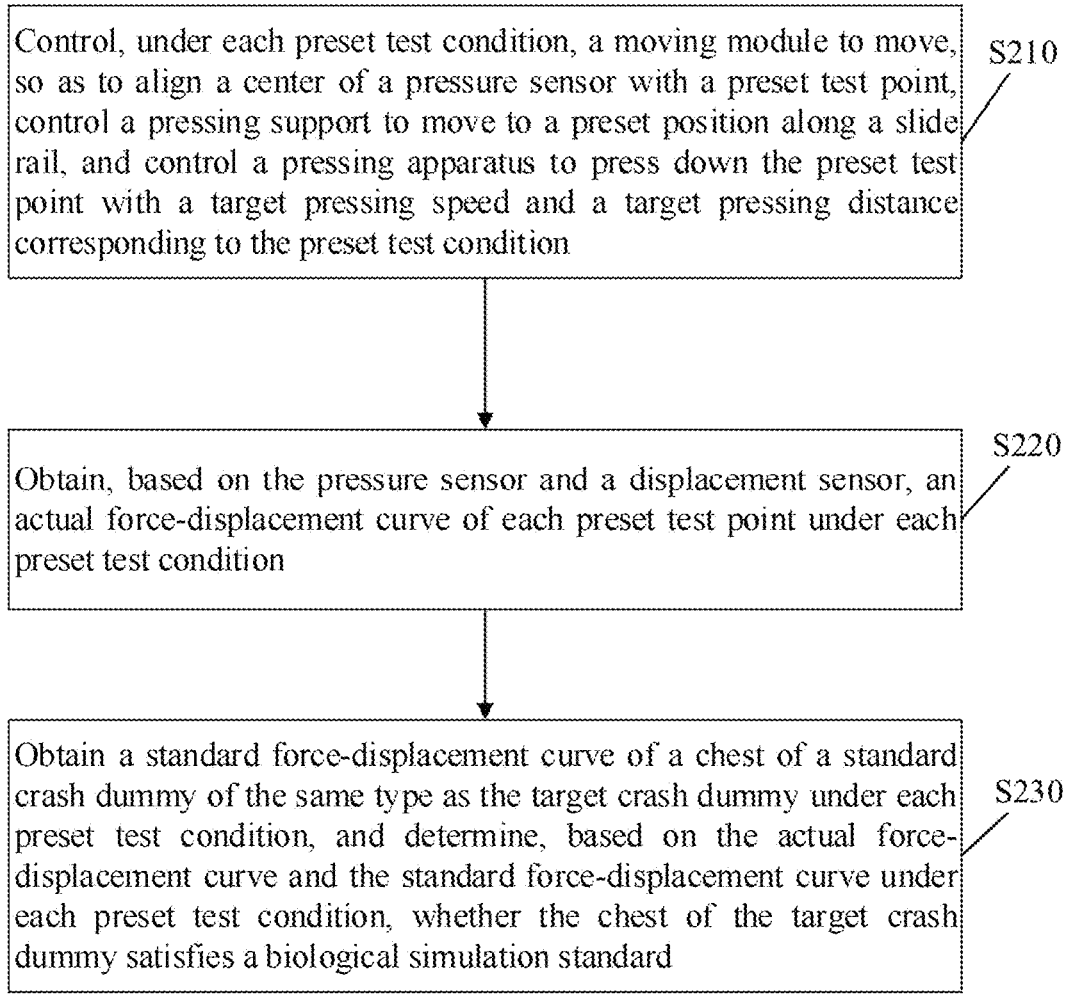
FIG. 3 is a flow diagram of another method for calibrating a chest of a vehicle crash dummy according to an embodiment of the present disclosure.

FIG. 3 is a flow diagram of another method for calibrating a chest of a vehicle crash dummy according to an embodiment of the present disclosure. Based on the above implementations, the operation of controlling the pressing apparatus to press down the chest of the target crash dummy is illustrated. The method is applied to a device for calibrating a chest of a vehicle crash dummy. The device for calibrating a chest of a vehicle crash dummy includes a fixed target crash dummy, a pressing apparatus, a moving module and a pressing support connected to a slide rail. The pressing apparatus is provided with a pressure sensor and a displacement sensor. A chest of the target crash dummy includes a plurality of preset test points. With reference to FIG. 3, the method for calibrating a chest of a vehicle crash dummy specifically includes:

S210, under each preset test condition, the moving module is controlled to move, so as to align a center of the pressure sensor with the preset test point, the pressing support is controlled to move to a preset position along the slide rail, and the pressing apparatus is controlled to press down the preset test point with a target pressing speed and a target pressing distance corresponding to the preset test condition.

In the embodiment, the moving module is capable of providing transitional degrees of freedom in two directions and has mounting holes. The moving module may be connected to a chest assembly of the target crash dummy by means of bolts. The slide rail includes a first slide rail and a second slide rail. The pressing support is connected to the first slide rail and the second slide rail by means of bolts, and is capable of being adjusted accordingly with position change of the moving module.

The preset test point may be a preset pressing point in the chest of the target crash dummy.

For example, in the embodiment, 6 test points may be set in the chest of the target crash dummy, for example, a joint of a first rib from top to bottom and a bolt, a joint of a third rib from top to bottom and a bolt, a joint of a sixth rib from top to bottom and a bolt, an intersection of a connecting line of a first rib from top to bottom and two connecting bolts and a chest centerline, an intersection of a connecting line of a third rib from top to bottom and two connecting bolts and a chest centerline, and an intersection of a connecting line of a sixth rib from top to bottom and two connecting bolts and a chest centerline.

Specifically, in addition to directly pressing the chest of the target crash dummy under different preset test conditions, each of the preset test points may be pressed under different preset test conditions in the embodiment, so as to obtain the actual force-displacement curves of each preset test point under different preset test conditions.

The moving module may be controlled to move, such that the chest assembly of the target crash dummy thereon moves, and further the center of the pressure sensor is aligned with the preset test point. Further, after the center of the pressure sensor is aligned with the preset test point, the pressing support is controlled to move to the preset position along the slide rail. The preset position may be an end of a spine box of the chest assembly of the target crash dummy.

Further, under each preset test condition, the pressing apparatus may be controlled to press down the preset test point, such that the actual force-displacement curve of the preset test point under each preset test condition is obtained.

S220, based on the pressure sensor and the displacement sensor, the actual force-displacement curve of each preset test point under each preset test condition is obtained.

Specifically, the actual force-displacement curve of each preset test point under each preset test condition can be obtained by repeating the above steps. For example, if the number of the preset test points is 6 and the number of the preset test conditions is 2, 12 actual force-displacement curves may be obtained, and each of the preset test points includes 2 actual force-displacement curves.

For example, under a preset test condition, the moving module may be controlled to move in sequence such that the center of the pressure sensor is sequentially aligned with all the preset test points, and then sequentially press all the preset test points, such that the actual force-displacement curves of all the preset test points under the preset test condition are obtained. By repeating the process, the actual force-displacement curves of all the preset test points under all the preset test conditions can be obtained.

Alternatively, under a preset test condition, the moving module may be controlled to move such that the center of the pressure sensor is sequentially aligned with one of the preset test points, and then press the preset test point, such that the actual force-displacement curve of the preset test point under the preset test condition is obtained. Further, the preset test point is continuously pressed with a target pressing speed and a target pressing distance corresponding to another preset test condition, and then the actual force-displacement curve of the preset test point under another preset test condition is obtained. Further, the above process may be repeated for the other preset test points, such that the actual force-displacement curves of the other preset test points under all the preset test conditions can be obtained.

S230, a standard force-displacement curve of a chest of a standard crash dummy of a same type as the target crash dummy under each preset test condition is obtained, and based on the actual force-displacement curve and the standard force-displacement curve under each preset test condition, whether the chest of the target crash dummy satisfies the biological simulation standard is determined.

In a specific implementation, the step that based on the actual force-displacement curve and the standard force-displacement curve under each preset test condition, whether the chest of the target crash dummy satisfies the biological simulation standard is determined includes:

for each preset test condition, the actual force-displacement curve of each preset test point is weighted to obtain an actual weighted force-displacement curve under the preset test condition, and according to the actual weighted force-displacement curve and a standard weighted force-displacement curve under the preset test condition, whether the chest of the target crash dummy satisfies the biological simulation standard under the preset test condition is determined; and alternatively, for each preset test point, based on the actual force-displacement curve and the standard force-displacement curve of the preset test point under each preset test condition, whether the preset test point satisfies the biological simulation standard is determined.

Specifically, after the actual force-displacement curve of each preset test point under each preset test condition is obtained, the actual force-displacement curves of all the preset test points under each preset test condition may be combined for the preset test condition, and the actual weighted force-displacement curve that may represent the entire chest of the target crash dummy may be obtained through weighting.

For example, for a preset test condition, the actual force-displacement curve of each preset test point under the preset test condition may be weighted to obtain the actual weighted force-displacement curve under the preset test condition as follows: a preset weighting coefficient corresponding to each preset test point is obtained, the actual force-displacement curve of each preset test point under the preset test condition is multiplied by the corresponding preset weighting coefficient, and further products of all the preset test points are added together, such that the actual weighted force-displacement curve is obtained. The preset weighting coefficient may be set according to test importance of each preset test point. A value of the preset weighting coefficient is in a range of [0,1], and the sum of all the preset weighting coefficients should be equal to 1.

In this way, after the actual weighted force-displacement curve under each preset test condition is obtained, whether the chest of the target crash dummy satisfies the biological simulation standard can be determined according to the actual weighted force-displacement curve and the standard weighted force-displacement curve under each preset test condition. Specifically, when a similarity between the actual weighted force-displacement curves and the standard weighted force-displacement curves under all the preset test conditions satisfies the preset similarity threshold, it can be determined that the chest of the target crash dummy satisfies the biological simulation standard.

It should be noted that reference may be made to an obtaining method of the actual weighted force-displacement curve for an obtaining method of the standard weighted force-displacement curve. Reference may be made to the above description, including a method for determining the similarity by computing the corridor grade of each displacement point, for a method for computing the similarity between the actual weighted force-displacement curve and the standard weighted force-displacement curve, which will not be repeated herein.

Compared with a method of directly measuring an actual force-displacement curve of a center of the chest of the target crash dummy, the method of measuring the actual force-displacement curves of all the preset test points and obtaining the actual weighted force-displacement curve representing the entire chest through weighting can improve the accuracy of determining whether the biological simulation standard is satisfied by combining crash conditions of all the points in the chest.

In addition to weighting as mentioned above whether the preset test point satisfies the biological simulation standard also can be directly determined according to the actual force-displacement curve and the standard force-displacement curve of the preset test point under each preset test condition without weighting.

Specifically, if the similarity between the actual force-displacement curves and the standard force-displacement curves of the preset test point under all the preset test conditions satisfies the preset similarity threshold, it may be determined that the preset test point satisfies the biological simulation standard. Further, when all the preset test points satisfy the biological simulation standard, it is determined that the chest of the target crash dummy satisfies the biological simulation standard.

Reference may be made to the above description, including a method for determining the similarity by computing the corridor grade of each displacement point, for a method for computing the similarity between the actual force-displacement curve and the standard force-displacement curve of each preset test point under each preset test condition, which will not be repeated herein.

In the above implementation, the actual force-displacement curve of each preset test point is measured, and further whether each preset test point satisfies the biological simulation standard is determined according to the actual force-displacement curve and the standard force-displacement curve of each preset test point under each preset test condition. In this way, accurate determination of each part of the chest of the target crash dummy is achieved, and further the accuracy of determining whether the chest of the target crash dummy satisfies the biological simulation standard is improved, and the case that a single part does not satisfy the standard but it is mistakenly determined that the chest of the target crash dummy satisfies the standard is avoided.

In the method for calibrating a chest of a vehicle crash dummy according to the embodiment, the moving module is controlled to move under each preset test condition such that the center of the pressure sensor is aligned with the preset test point, and further the pressing support is controlled to move to the preset position along the slide rail, and provides a supporting force for the chest of the target crash dummy. Further, the pressing apparatus is controlled to press down the preset test point, and the actual force-displacement curve of each preset test point under each preset test condition is collected. Compared with a method for calibrating a single test point, the method collects the actual force-displacement curves of the plurality of preset test points under each preset test condition, such that difference of the chest of the crash dummy can be more comprehensively determined, and further the accuracy of determining whether the chest of the target crash dummy satisfies the biological simulation standard can be improved.

Figure 4:
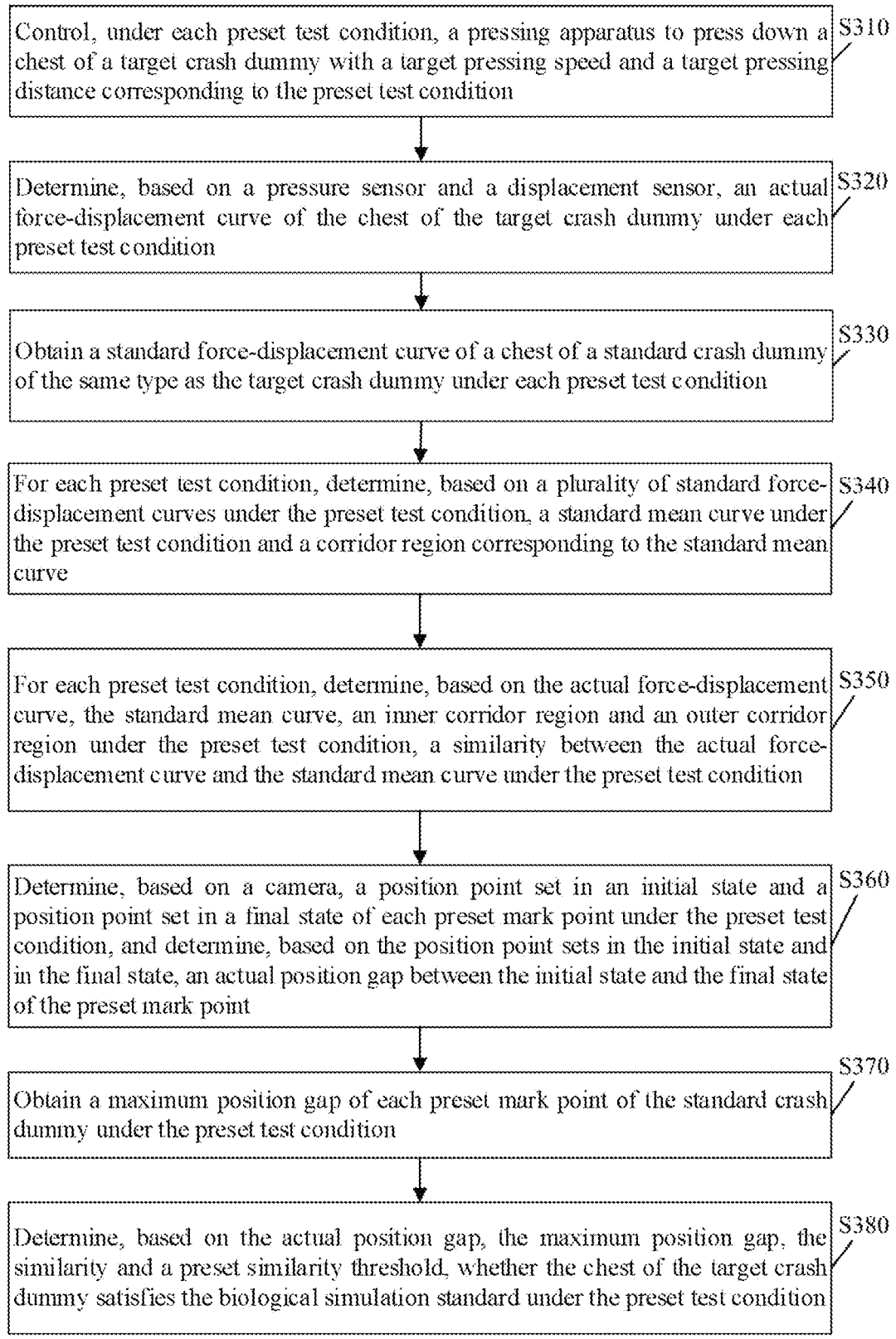
FIG. 4 is a flow diagram of yet another method for calibrating a chest of a vehicle crash dummy according to an embodiment of the present disclosure.

FIG. 4 is a flow diagram of yet another method for calibrating a chest of a vehicle crash dummy according to an embodiment of the present disclosure. Based on the above implementations, a process of determining whether the biological simulation standard is satisfied according to the similarity and the preset similarity threshold is illustrated. The method is applied to a device for calibrating a chest of a vehicle crash dummy. The device for calibrating a chest of a vehicle crash dummy includes a fixed target crash dummy, a pressing apparatus, and a camera aiming at preset mark points. The pressing apparatus is provided with a pressure sensor and a displacement sensor. The target crash dummy includes a plurality of preset mark points. With reference to FIG. 4, the method for calibrating a chest of a vehicle crash dummy specifically includes:

S310, under each preset test condition, the pressing apparatus is controlled to press down a chest of the target crash dummy with a target pressing speed and a target pressing distance corresponding to the preset test condition.

S320, based on the pressure sensor and the displacement sensor, an actual force-displacement curve of the chest of the target crash dummy under each preset test condition is determined.

S330, a standard force-displacement curve of a chest of a standard crash dummy of a same type as the target crash dummy under each preset test condition is obtained.

S340, for each preset test condition, based on a plurality of standard force-displacement curves under the preset test condition, a standard mean curve under the preset test condition and a corridor region corresponding to the standard mean curve are determined.

The corridor region covers all the standard force-displacement curves, and includes an inner corridor region and an outer corridor region.

S350, for each preset test condition, based on the actual force-displacement curve, the standard mean curve, the inner corridor region and the outer corridor region under the preset test condition, a similarity between the actual force-displacement curve and the standard mean curve under the preset test condition is determined.

S360, based on the camera, a position point set in an initial state and a position point set in a final state of each preset mark point under the preset test condition are determined, and based on the position point sets in the initial state and in the final state, an actual position gap between the initial state and the final state of the preset mark point is determined.

The preset mark point may be a point where a reflective mark is set in the chest of the target crash dummy. For example, the preset mark points may be evenly arranged at a bottom of a sixth rib in the chest of the target crash dummy. The camera may conduct photographing by aiming at the bottom of the sixth rib in the chest.

For example, the chest of the target crash dummy may include six ribs, and a rib at a bottom is the sixth rib. 10 reflective marks may be pasted at a bottom of the sixth rib in the chest of the target crash dummy at appropriate intervals. The camera may aim at a bottom of the chest of the target crash dummy, so as to collect position changes of each preset mark points at the bottom of the sixth rib.

Specifically, the camera may collect a real-time image of the bottom of the chest of the target crash dummy in a pressing process of each preset test condition, so as to photograph position of each preset mark point in the pressing process.

In the embodiment, the initial state may be a state of the pressing apparatus before pressing under each preset test condition, and the final state may be a state of the pressing apparatus after pressing and returning under each preset test condition.

The position point set in the initial state may include a plurality of position points in the initial state. The position points in the initial state may be understood as positions of the preset mark points when the pressing apparatus is in contact with a chest surface but does not press down. The position point set in the final state may include a plurality of position points in the final state. The position points in the final state may be understood as positions of the preset mark points after the pressing apparatus completes pressing and returning. That is, the position points in the initial state and the position points in the final state are position points before pressing and after pressing and returning, respectively.

Specifically, each preset test condition may be repeatedly implemented to obtain the position points in the initial state and the position points in the final state under each preset test condition. Further, the position point sets in the initial state and in the final state under each preset test condition are constituted.

Further, the actual position gap under each preset test condition may be determined according to the position point sets in the initial state and in the final state under each preset test condition. The actual position gap may represent a position gap of the chest of the target crash dummy before pressing and after pressing and returning.

For example, a mean of the position point set in the initial state and a mean of the position point set in the final state may be determined, and a difference between the means is used as the actual position gap; and alternatively, a difference between each of the position points in the initial state and each of the position points in the final state corresponding to the same preset mark point is computed, and a maximum difference is used as the actual position gap.

In a specific implementation, the step that based on the position point sets in the initial state and in the final state, the actual position gap between the initial state and the final state of the preset mark point is determined may include: a closed curve of initial positions is constructed based on the position point set in the initial state, and a closed curve of final positions is constructed based on the position point set in the final state; and a first region covered by the closed curve of initial positions and a second region covered by the closed curve of final positions are determined, a first area covered by a union of the first region and the second region and a second area covered by an intersection of the first region and the second region are determined, and a difference between the first area and the second area is determined to be the actual position gap.

Specifically, the closed curve of initial positions may be obtained through spline fitting of the position point set in the initial state; and the closed curve of final positions may be obtained through spline fitting of the position point set in the final state.

Further, the first area covered by the union between the first region covered by the closed curve of initial positions and the second region covered by the closed curve of final positions and the second area covered by the intersection between the first region and the second region is determined, and the difference between the first area and the second area may be used as the actual position gap.

In the above implementation, the closed curve of initial positions and the closed curve of final positions are fitted, and further the actual position gap is determined according to an area difference between the union and the intersection of the regions covered by the two closed curves, such that accurate determination of the position gap of the chest of the target crash dummy before pressing and after pressing and returning is achieved.

S370, a maximum position gap of each preset mark point of the standard crash dummy under the preset test condition is obtained.

Specifically, the same multiple preset mark points may be set on the chest of the standard crash dummy. Further, in this way, the position gap of the chest of the standard crash dummy before pressing and after pressing and returning under each preset test condition may be determined.

For each preset test condition, the above process may be repeated, and a maximum value of all the position gaps under the preset test condition is used as the maximum position gap under the preset test condition. For example, each preset test condition may be repeated for ten times, and 10 position gaps are obtained. A maximum value of the position gaps is used as the maximum position gap under the preset test condition.

S380, based on the actual position gap, the maximum position gap, the similarity and the preset similarity threshold, whether the chest of the target crash dummy satisfies the biological simulation standard under the preset test condition is determined.

After the actual position gap of the target crash dummy before pressing and after pressing and returning under each preset test condition and the maximum position gap of the standard crash dummy before pressing and after pressing and returning under each preset test condition are obtained, whether the chest of the target crash dummy satisfies the biological simulation standard under each preset test condition may be determined by combining the actual position gap, the maximum position gap, the similarity and the preset similarity threshold for the preset test condition.

Specifically, if the actual position gap of each preset test point is less than or equal to the maximum position gap of each preset test point, and the similarity of each preset test point is greater than or equal to the preset similarity threshold, it may be determined that the chest of the target crash dummy satisfies the biological simulation standard under the preset test condition. If an actual position gap of some preset test point is greater than the maximum position gap of the preset test point, and alternatively, the similarity of some preset test point is less than the preset similarity threshold, it may be determined that the chest of the target crash dummy does not satisfy the biological simulation standard under the preset test condition.

In the method for calibrating a chest of a vehicle crash dummy according to the embodiment, the camera collects the position point sets in the initial state and in the final state of each preset mark point of the target crash dummy under each preset test condition. Further, the actual position gap of the target crash dummy before pressing and after pressing and returning under each preset test condition is determined. The actual position gap is compared with the maximum position gap of the standard crash dummy, and the similarity is compared with the preset similarity threshold, such that the biological simulation standard may be determined by combining the actual position gap of the target crash dummy before pressing and after pressing and returning and the changing relation between the force and the displacement. By using this method, whether the chest of the target crash dummy satisfies the biological simulation standard can be accurately determined from two aspects: the actual position gap and the changing relation between the force and the displacement, which further improves determination accuracy, and further ensures accuracy and authenticity of subsequent crash tests.

Figure 5:
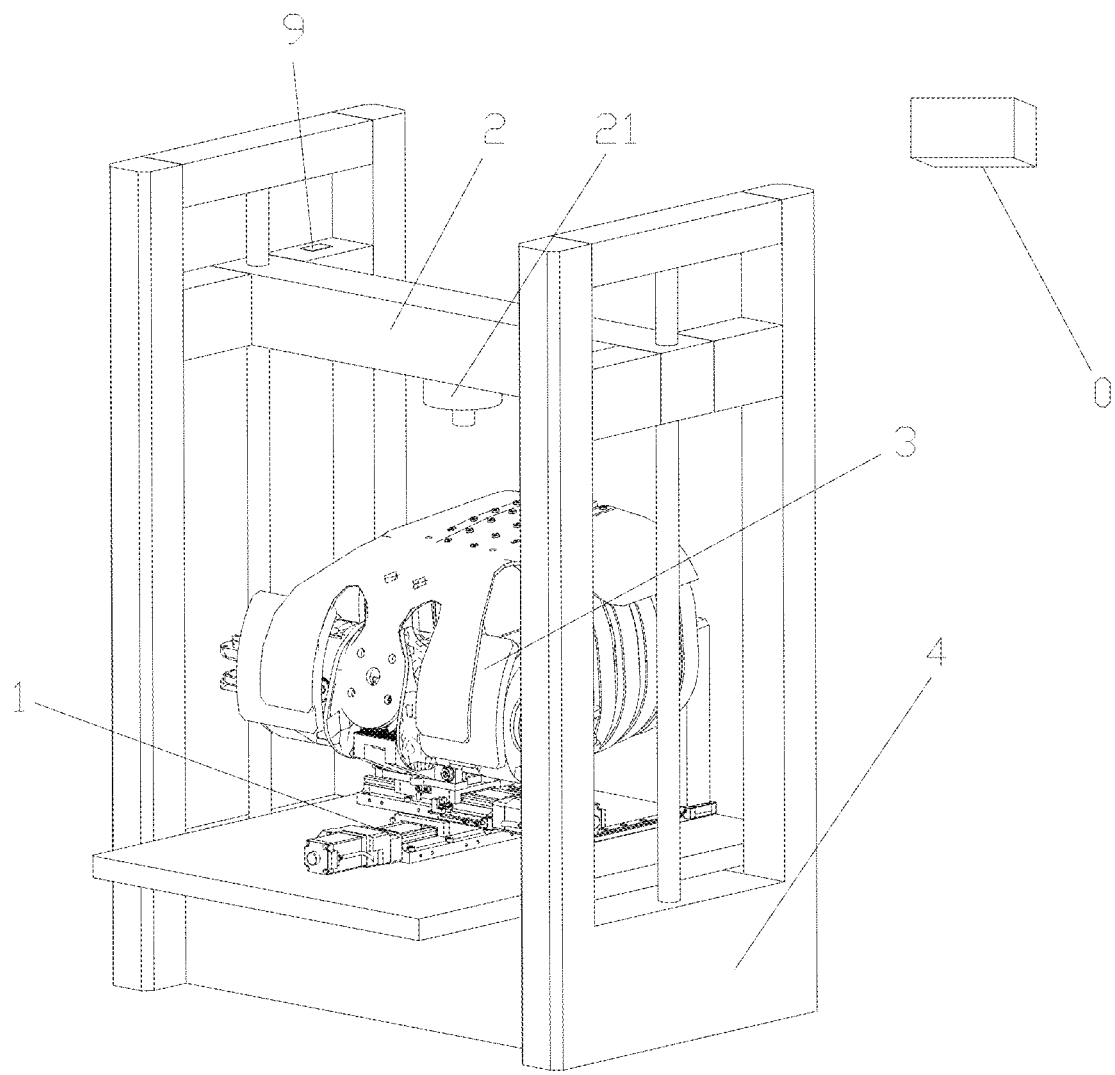
FIG. 5 is a schematic structural diagram of a device for calibrating a chest of a vehicle crash dummy according to an embodiment of the present disclosure.
Figure 6:
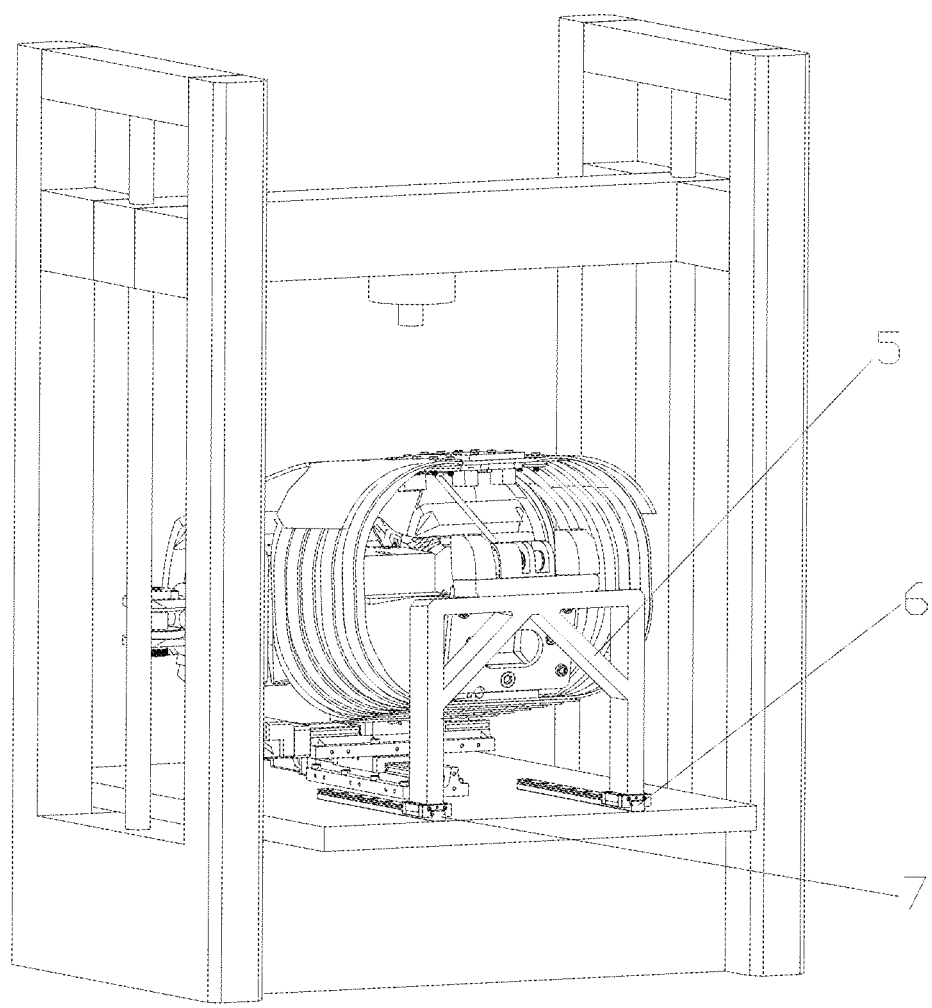
FIG. 6 is a back view of a device for calibrating a chest of a vehicle crash dummy according to an embodiment of the present disclosure.
Figure 7:
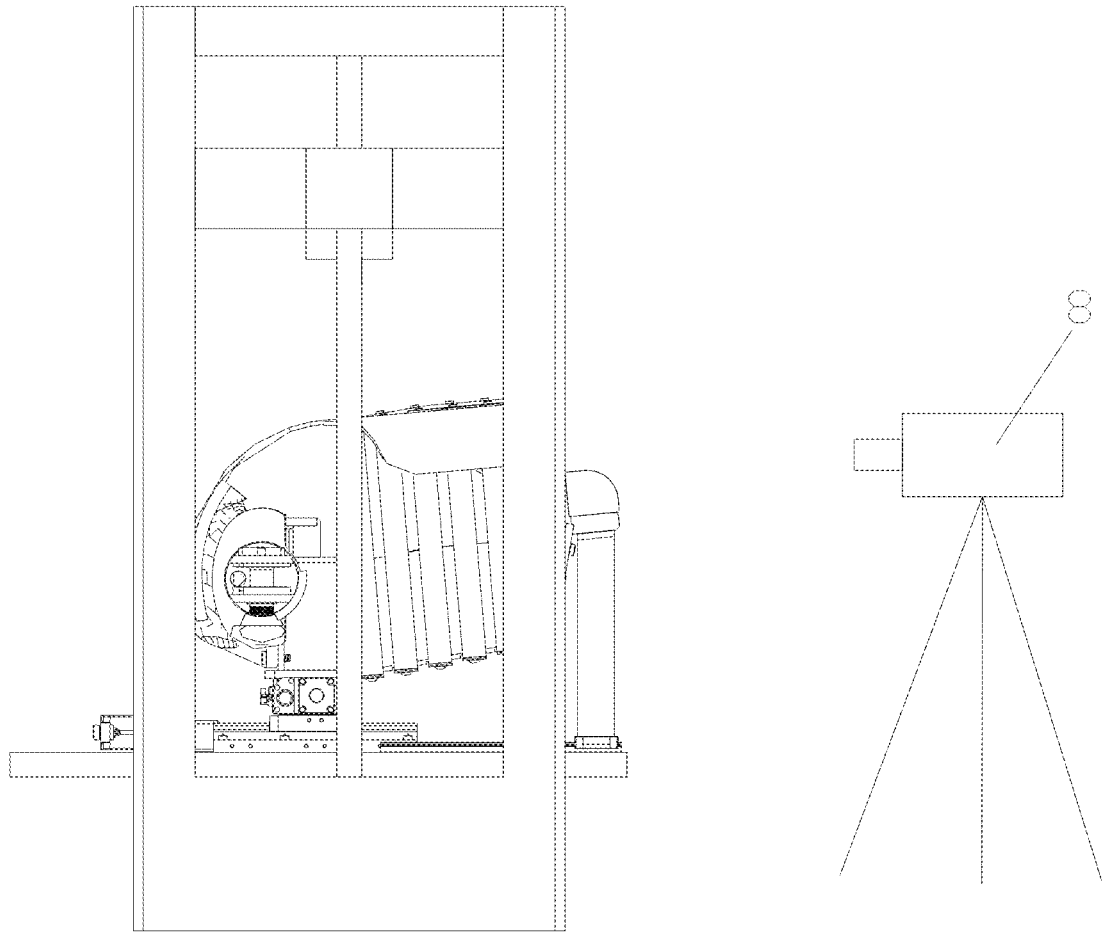
FIG. 7 is a side view of a device for calibrating a chest of a vehicle crash dummy according to an embodiment of the present disclosure.

FIG. 5 is a schematic structural diagram of a device for calibrating a chest of a vehicle crash dummy according to an embodiment of the present disclosure. FIG. 6 is a back view of a device for calibrating a chest of a vehicle crash dummy according to an embodiment of the present disclosure. FIG. 7 is a side view of a device for calibrating a chest of a vehicle crash dummy according to an embodiment of the present disclosure. The device for calibrating a chest of a vehicle crash dummy is configured to implement the method for calibrating a chest of a vehicle crash dummy according to all the above embodiments.

As shown in FIGS. 5-7, the device for calibrating a chest of a vehicle crash dummy includes a control apparatus 0, a pressing apparatus 2, and a fixed target crash dummy 3. The pressing apparatus 2 is provided with a pressure sensor 21 and a displacement sensor 9. The control apparatus 0 is connected to the displacement sensor 9, the pressing apparatus 2 and the pressure sensor 21 respectively. The components are configured as follows:

The pressing apparatus 2 is configured to press down the chest of the target crash dummy.

The displacement sensor 9 is configured to collect displacement of the chest of the target crash dummy in a process of pressing down the chest of the target crash dummy by the pressing apparatus 2.

The pressure sensor 21 is configured to collect force of the chest of the target crash dummy in the process of pressing down the chest of the target crash dummy by the pressing apparatus 2.

The control apparatus 0 is configured to control, under each preset test condition, the pressing apparatus 2 to press down the chest of the target crash dummy with a target pressing speed and a target pressing distance corresponding to the preset test condition; determine, according to the displacement and the force, an actual force-displacement curve of the chest of the target crash dummy under each preset test condition; and obtain a standard force-displacement curve of a chest of a standard crash dummy of a same type as the target crash dummy under each preset test condition, and determine, based on the actual force-displacement curve and the standard force-displacement curve under each preset test condition, whether the chest of the target crash dummy satisfies a biological simulation standard.

Based on the above implementation, alternatively, the device for calibrating a chest of a vehicle crash dummy further includes a moving module 1 and a pressing support 5 connected to a slide rail, where the slide rail includes a first slide rail 6 and a second slide rail 7, and the pressing support 5 is connected to the first slide rail 6 and the second slide rail 7 respectively. The control apparatus 0 is further configured to control, under each preset test condition, the moving module to move, so as to align a center of the pressure sensor with a preset test point; control the pressing support to move to a preset position along the slide rail, and control the pressing apparatus to press down the preset test point with the target pressing speed and the target pressing distance corresponding to the preset test condition; and obtain, based on the pressure sensor and the displacement sensor, an actual force-displacement curve of each preset test point under each preset test condition.

Based on the above implementation, alternatively, the control apparatus 0 is further configured to weight, for each preset test condition, the actual force-displacement curve of each preset test point, obtain an actual weighted force-displacement curve of the preset test condition, and determine, according to the actual weighted force-displacement curve and a standard weighted force-displacement curve under the preset test condition, whether the chest of the target crash dummy satisfies the biological simulation standard under the preset test condition; and alternatively, determine, for each preset test point, whether the preset test point satisfies the biological simulation standard based on the actual force-displacement curve and the standard force-displacement curve of the preset test point under each preset test condition.

Based on the above implementation, alternatively, the control apparatus 0 is further configured to determine, for each preset test condition, a standard mean curve under the preset test condition and a corridor region corresponding to the standard mean curve based on a plurality of standard force-displacement curves under the preset test condition, where the corridor region covers all the standard force-displacement curves, and includes an inner corridor region and an outer corridor region; and determine, for each preset test condition, whether the chest of the target crash dummy satisfies the biological simulation standard under the preset test condition based on the actual force-displacement curve, the standard mean curve, the inner corridor region and the outer corridor region under the preset test condition.

Based on the above implementation, alternatively, the control apparatus 0 is further configured to determine, based on the actual force-displacement curve, the standard mean curve, the inner corridor region and the outer corridor region under the preset test condition, a similarity between the actual force-displacement curve and the standard mean curve under the preset test condition; and determine, according to the similarity and a preset similarity threshold, whether the chest of the target crash dummy satisfies the biological simulation standard under the preset test condition.

Based on the above implementation, alternatively, the control apparatus 0 is further configured to determine, for each displacement point in the actual force-displacement curve under the preset test condition, an actual force corresponding to the displacement point in the actual force-displacement curve and a reference force corresponding to the displacement point in the standard mean curve; determine an actual difference between the actual force and the reference force, and determine a corridor grade of the displacement point based on the actual difference and widths of the inner corridor region and the outer corridor region; and determine, based on the corridor grade of each displacement point, the similarity between the actual force-displacement curve and the standard mean curve under the preset test condition.

Based on the above implementation, alternatively, the control apparatus 0 is further configured to determine, if the actual difference is less than half of the width of the inner corridor region, the corridor grade of the displacement point to be a first value; determine, if the actual difference is greater than half of the width of the outer corridor region, the corridor grade of the displacement point to be a second value; and determine, if the actual difference is greater than half of the width of the inner corridor region and less than that of the outer corridor region, the corridor grade of the displacement point based on the actual difference, half of the width of the outer corridor region, a width difference between half of the width of the inner corridor region and that of the outer corridor region, and a preset attenuation index, where the first value is greater than the second value, and the greater the corridor grade of the displacement point, the more similar the actual force-displacement curve is to the standard mean curve at the displacement point.

Based on the above implementation, alternatively, the chest of the target crash dummy includes a plurality of preset mark points, and the device for calibrating a chest of a vehicle crash dummy further includes a camera 8 aiming at the preset mark points; and the control apparatus 0 is further configured to determine, based on the camera, a position point set in an initial state and a position point set in a final state of each preset mark point under the preset test condition; determine, based on the position point sets in the initial state and in the final state, an actual position gap between the initial state and the final state of the preset mark point; obtain a maximum position gap of each preset mark point of the standard crash dummy under the preset test condition; and determine, based on the actual position gap, the maximum position gap, the similarity and the preset similarity threshold, whether the chest of the target crash dummy satisfies the biological simulation standard under the preset test condition.

Based on the above implementation, alternatively, the control apparatus 0 is further configured to construct a closed curve of initial positions based on the position point set in the initial state, and construct a closed curve of final positions based on the position point set in the final state; and determine a first region covered by the closed curve of initial positions and a second region covered by the closed curve of final positions, determine a first area covered by a union of the first region and the second region and a second area covered by an intersection of the first region and the second region, and determine a difference between the first area and the second area to be the actual position gap.

In the embodiment, the target crash dummy may be a Hybrid III 50th dummy. Before each preset test condition, the chest assembly of the target crash dummy may be placed in an environment at a temperature of about 21° C. and with a relative humidity in a range of 10%-70% for at least 4 h, and a chest calibration test may be conducted under the above temperature and humidity.

For example, the chest assembly of the target crash dummy is connected to the moving module 1 by means of bolts, and an end of a spine box is placed on a cross beam of the pressing support 5, and 10 reflective marks are pasted at a bottom of a sixth rib of the chest at appropriate intervals. The pressure sensor 21 on the pressing apparatus 2 is released to a state in which a lower end of the pressure sensor is in close contact with the upper surface of the chest, positions of the moving module 1 and the pressing support 5 are adjusted such that the center of the pressure sensor is aligned with a center of a joint of a first rib of the chest from top to bottom and a bolt, and a position of the current reflective mark is photographed by the camera 8. The pressure sensor is set to press down to 30 mm and 60 mm at speeds of 0.2 m/s and 0.4 m/s, respectively, and meanwhile, the pressure sensor is set to press down to the limit position and keep for 0.1 s and then return upward. A returning speed is consistent with a pressing speed. The actual force-displacement curves of the chest of the dummy in a pressing process of the pressure sensor and the displacement sensor are collected, and positions of the reflective mark when the pressure sensor 21 is pressed to the limit position and after the pressure sensor leaves the chest are photographed respectively by the camera 8.

The embodiment has the following technical effects: under each preset test condition, the pressing apparatus is controlled to press down the chest of the target crash dummy with the target pressing speed and the target pressing distance corresponding to the preset test condition, the actual force-displacement curve of the chest of the target crash dummy under each preset test condition is obtained, the standard force-displacement curve of the chest of the standard crash dummy of the same type as the target crash dummy under each preset test condition is obtained, and according to the actual force-displacement curve and the standard force-displacement curve under each preset test condition, whether the chest of the target crash dummy satisfies the biological simulation standard is determined. Through determination according to the actual force-displacement curve and the standard force-displacement curve under each preset test condition, various complicated conditions of impact on the chest can be more effectively simulated in a crash test by using the method, which comprehensively determines the differences of the chest of the crash dummy, solves a problem of a single calibration mode in the prior art, and further improves the accuracy of determining the biological simulation standard and ensures the validity and accuracy of a subsequent crash test using a dummy.

The device for calibrating a chest of a vehicle crash dummy in the embodiment is suitable for various percentile dummies and various working conditions due to the adjustable angle and height.

It should be noted that the terms used in the present disclosure are only used for describing specific embodiments, rather than limiting the scope of the present application. As shown in the description and claims of the present disclosure, unless the context clearly dictates otherwise, the words "a", "one", "an", and/or "the" are not intended to specifically refer to the singular and can include the plural. The terms "include", "comprise", or any variants thereof are intended to cover a non-exclusive inclusion, so that a process, method, or device that includes a series of elements not only includes these elements, but also includes other elements not listed explicitly, or includes inherent elements of the process, method, or device. In the absence of more limitations, an element defined by "include a . . . " does not exclude other same elements existing in the process, method, or device including the element.

It should also be noted that the orientation or position relationships indicated by the terms "center", "upper", "lower", "left", "right", "vertical", "horizontal", "inner", "outer", etc. are based on the orientation or position relationships shown in the accompanying drawings and are intended to facilitate the description of the present disclosure and simplify the description only, rather than indicating or implying that the device or element referred to must have a particular orientation or be constructed and operated in a particular orientation, and cannot be interpreted as limiting the present disclosure. Unless otherwise specified and defined, the terms "mounted", "coupled" and "connected" should be generally understood, for example, the "connected" may be fixedly connected, detachably connected, integrally connected, mechanically connected, electrically connected, directly connected, or connected by a medium, or internal communication between two elements. For those of ordinary skill in the art, the specific meanings of the terms described above in the present disclosure can be construed according to specific circumstances.

Finally, it should be noted that the above embodiments are merely used to describe the technical solutions of the present disclosure, instead of limiting the same. Although the present disclosure has been described in detail with reference to all the foregoing embodiments, those of ordinary skill in the art should understand that the technical solutions described in all the foregoing embodiments can still be modified, and alternatively, some or all the technical features therein can be equivalently replaced. However, these modifications or substitutions do not make the essence of the corresponding technical solutions deviate from the technical solutions of all the embodiments of the present disclosure.

What is claimed is:

1. A method for calibrating a chest of a vehicle crash dummy, wherein the method is applied to a device for calibrating a chest of a vehicle crash dummy, the device comprises a fixed target crash dummy and a pressing apparatus, and the pressing apparatus is provided with a pressure sensor and a displacement sensor;

the method comprises:
controlling, under each preset test condition, the pressing apparatus to press down a chest of the target crash dummy with a target pressing speed and a target pressing distance corresponding to the preset test condition;
determining, based on the pressure sensor and the displacement sensor, an actual force-displacement curve of the chest of the target crash dummy under each preset test condition, wherein the actual force-displacement curve is configured to describe a changing relation between force and displacement; and
obtaining a standard force-displacement curve of a chest of a standard crash dummy of a same type as the target crash dummy under each preset test condition, and determining, based on the actual force-displacement curve and the standard force-displacement curve under each preset test condition, whether the chest of the target crash dummy satisfies a biological simulation standard;
the determining, based on the actual force-displacement curve and the standard force-displacement curve under each preset test condition, whether the chest of the target crash dummy satisfies a biological simulation standard comprises:
for each preset test condition, determining, based on a plurality of standard force-displacement curves under the preset test condition, a standard mean curve under the preset test condition and a corridor region corresponding to the standard mean curve, wherein the corridor region covers all the standard force-displacement curves, and comprises an inner corridor region and an outer corridor region; and
for each preset test condition, determining, based on the actual force-displacement curve, the standard mean curve, the inner corridor region and the outer corridor region under the preset test condition, whether the chest of the target crash dummy satisfies the biological simulation standard under the preset test condition;
the determining, based on the actual force-displacement curve, the standard mean curve, the inner corridor region and the outer corridor region under the preset test condition, whether the chest of the target crash dummy satisfies the biological simulation standard under the preset test condition comprises:
determining, based on the actual force-displacement curve, the standard mean curve, the inner corridor region and the outer corridor region under the preset test condition, a similarity between the actual force-displacement curve and the standard mean curve under the preset test condition; and
determining, according to the similarity and a preset similarity threshold, whether the chest of the target crash dummy satisfies the biological simulation standard under the preset test condition;
the chest of the target crash dummy comprises a plurality of preset mark points, and the device further comprises a camera aiming at the preset mark points; and the determining, according to the similarity and a preset similarity threshold, whether the chest of the target crash dummy satisfies the biological simulation standard under the preset test condition comprises:
determining, based on the camera, a position point set in an initial state and a position point set in a final state of each preset mark point under the preset test condition;
determining, based on the position point sets in the initial state and in the final state, an actual position gap between the initial state and the final state of the preset mark point;
obtaining a maximum position gap of each preset mark point of the standard crash dummy under the preset test condition; and
determining, based on the actual position gap, the maximum position gap, the similarity and the preset similarity threshold, whether the chest of the target crash dummy satisfies the biological simulation standard under the preset test condition.

2. The method according to claim 1, wherein the device further comprises a moving module and a pressing support connected to a slide rail, the chest of the target crash dummy comprises a plurality of preset test points, and controlling, under each preset test condition, the pressing apparatus to press down the chest of the target crash dummy with a target pressing speed and a target pressing distance corresponding to the preset test condition comprises:
controlling, under each preset test condition, the moving module to move, so as to align a center of the pressure sensor with the preset test point; and
controlling the pressing support to move to a preset position along the slide rail, and controlling the pressing apparatus to press down the preset test point with the target pressing speed and the target pressing distance corresponding to the preset test condition; and
accordingly, determining, based on the pressure sensor and the displacement sensor, an actual force-displacement curve of the chest of the target crash dummy under each preset test condition comprises:
obtaining, based on the pressure sensor and the displacement sensor, an actual force-displacement curve of each preset test point under each preset test condition.

3. The method according to claim 2, wherein the determining, based on the actual force-displacement curve and the standard force-displacement curve under each preset test condition, whether the chest of the target crash dummy satisfies a biological simulation standard comprises:
for each preset test condition, weighting the actual force-displacement curve of each preset test point, obtaining an actual weighted force-displacement curve of the preset test condition, and determining, according to the actual weighted force-displacement curve and a standard weighted force-displacement curve under the preset test condition, whether the chest of the target crash dummy satisfies the biological simulation standard under the preset test condition; and alternatively,
for each preset test point, determining, based on the actual force-displacement curve and the standard force-displacement curve of the preset test point under each preset test condition, whether the preset test point satisfies the biological simulation standard.

4. The method according to claim 1, wherein the determining, based on the actual force-displacement curve, the standard mean curve, the inner corridor region and the outer corridor region under the preset test condition, a similarity between the actual force-displacement curve and the standard mean curve under the preset test condition comprises:
for each displacement point in the actual force-displacement curve under the preset test condition, determining an actual force corresponding to the displacement point in the actual force-displacement curve and a reference force corresponding to the displacement point in the standard mean curve;

determining an actual difference between the actual force and the reference force, and determining a corridor grade of the displacement point based on the actual difference, a width of the inner corridor region and a width of the outer corridor region; and determining, based on the corridor grade of each displacement point, the similarity between the actual force-displacement curve and the standard mean curve under the preset test condition.

5. The method according to claim 4, wherein the determining a corridor grade of the displacement point based on the actual difference, a width of the inner corridor region and a width of the outer corridor region comprises:

determining, if the actual difference is less than half of the width of the inner corridor region, the corridor grade of the displacement point to be a first value;

determining, if the actual difference is greater than half of the width of the outer corridor region, the corridor grade of the displacement point to be a second value; and determining, if the actual difference is greater than half of the width of the inner corridor region and less than that of the outer corridor region, the corridor grade of the displacement point based on the actual difference, half of the width of the outer corridor region, a width difference between half of the width of the inner corridor region and that of the outer corridor region, and a preset attenuation index;

the first value is greater than the second value, and the greater the corridor grade of the displacement point, the more similar the actual force-displacement curve is to the standard mean curve at the displacement point.

6. The method according to claim 1, wherein the determining, based on the position point sets in the initial state and in the final state, an actual position gap between the initial state and the final state of the preset mark point comprises:

constructing a closed curve of initial positions based on the position point set in the initial state, and constructing a closed curve of final positions based on the position point set in the final state; and determining a first region covered by the closed curve of initial positions and a second region covered by the closed curve of final positions, determining a first area covered by a union of the first region and the second region and a second area covered by an intersection of the first region and the second region, and determining a difference between the first area and the second area to be the actual position gap.

7. A device for calibrating a chest of a vehicle crash dummy, wherein the device is configured to implement the method for calibrating a chest of a vehicle crash dummy according to claim 1 and comprises a fixed target crash dummy, a pressing apparatus, and a control apparatus; the pressing apparatus is provided with a pressure sensor and a displacement sensor, and the control apparatus is connected to the displacement sensor, the pressing apparatus and the pressure sensor respectively;

the pressing apparatus is configured to press down the chest of the target crash dummy;

the displacement sensor is configured to collect displacement of the chest of the target crash dummy in a process of pressing down the chest of the target crash dummy by the pressing apparatus;

the pressure sensor is configured to collect force of the chest of the target crash dummy in the process of pressing down the chest of the target crash dummy by the pressing apparatus; and the control apparatus is configured to control, under each preset test condition, the pressing apparatus to press down the chest of the target crash dummy with a target pressing speed and a target pressing distance corresponding to the preset test condition; determine, according to the displacement and the force, an actual force-displacement curve of the chest of the target crash dummy under each preset test condition; and obtain a standard force-displacement curve of a chest of a standard crash dummy of the same type as the target crash dummy under each preset test condition, and determine, based on the actual force-displacement curve and the standard force-displacement curve under each preset test condition, whether the chest of the target crash dummy satisfies a biological simulation standard.

* * * * *